United States Patent [19]

Stamm et al.

[11] 4,301,011

[45] Nov. 17, 1981

[54] WATER STRAINER

[75] Inventors: Johann A. Stamm, Export; James C. Sarver, Jr., Trafford; Ronald N. Koch, Allison Park, all of Pa.

[73] Assignee: Rockwell International Corporation, Pittsburgh, Pa.

[21] Appl. No.: 161,249

[22] Filed: Jun. 20, 1980

[51] Int. Cl.³ .......................................... B01D 29/00
[52] U.S. Cl. ............................................... 210/447
[58] Field of Search ............. 210/407, 409, 435, 446, 210/497.3, 498, 499, 447

[56] References Cited

U.S. PATENT DOCUMENTS

| | | | |
|---|---|---|---|
| 603,120 | 4/1898 | Worthington | 210/498 |
| 1,458,464 | 6/1923 | Byers | 210/497.3 |
| 1,488,671 | 4/1924 | Hale | 210/499 |

*Primary Examiner*—Ivars C. Cintins

[57] ABSTRACT

A water strainer is comprised of a body which contains a central chamber with which the inlet and outlet passages communicate. Strainer grids angularly oriented with respect to each other meet to form the apex of a triangle within the central chamber adjacent the inlet passage. Debris and foreign material caught on the grid is washed by the flow of water through the strainer towards regions near the side of the interior of the body where it will not impede the flow of the mainstream of the water through the grid, or cause an unsymmetrical flow velocity profile in the water stream issuing from the strainer.

9 Claims, 3 Drawing Figures

WATER STRAINER

BACKGROUND OF THE INVENTION

This invention relates to strainers for removing debris and other foreign material from water or other fluids. It is conventional in the water strainer art to provide strainer grids which bridge the flow passages through the strainer in a plane generally perpendicular to the mainstream of water. In such prior art devices, however, as the debris and foreign material is removed from the water, it accumulates on the grids and closes the openings through the grids thus inhibiting the flow of water through the strainer. This causes an excessive pressure drop across the strainer unless the grids are frequently removed for cleaning. Also, strainers are usually located upstream of meters to insure that foreign particles of any significant size are removed from the flow stream to prevent damage to the meters which would otherwise be caused by the particles impinging on the measuring elements of the meters. In the prior art strainers' accumulation of foreign material on the grid in the path of the main flow stream distorts the normally symmetrical flow velocity profile. Certain types of meters such as turbine meters are sensitive to the velocity profiles of the flow and the accuracy of such meters is adversely effected by unsymmetrical flow velocity profile. In order to prevent the accumulation on the grid of excessive amounts such debris and foreign material and the adverse effects incident thereto, frequent maintenance is required in order to manually remove and clean the grids of such prior art strainers.

SUMMARY OF THE INVENTION

The present invention, therefore, contemplates grids which are oriented at an angle with respect to the direction of the water flow such that one end of the grid is located near the inlet, the other being located near the outlet and at a side wall so that as the foreign matter is removed from the water by the grids, the thrust of the water flow tends to wash the foreign matter toward a region within the central chamber off to the side of the main flow stream where it will not greatly affect the flow velocity profile and where it may be easily removed through passages provided at the bottom of the body wall.

Also, water industry standards require that the summation of the area of all of the openings through the grid be equal to at least twice the cross-sectional area of the internal flow passage of the pipeline in which it is installed. Thus, for a given size strainer housing, by angularly orienting the grids, larger grids can be used which permits the use of smaller individual openings than can be used with perpendicularly positioned grids which, of course, results in the removal of smaller sized foreign particles from the flow stream. On the other hand for a given size of grid openings, a housing of lesser size may be used when the grids are angularly positioned with respect to the axis of flow.

THE PRIOR ART

Strainers with grids which are angularly disposed with respect to the main flow stream are shown in the patents to Park, U.S. Pat. No. 551,044, Worthington, U.S. Pat. No. 603,120, Potts, U.S. Pat. No. 1,000,843, Rowley U.S. Pat. No. 1,480,420, and Ray et al, U.S. Pat. No. 1,821,190.

The patents to Park, Potts, Rowley and Ray et al all show essentially single grid elements which are diagonally disposed across the interior of the strainer housing and angularly disposed with respect to the main flow stream. The patent to Worthington shows angularly oriented grids forming the apex of a triangle which is located adjacent the outlet. None of the patents show grids which are angularly oriented to form the apex of a triangle adjacent the inlet, and except for Rowley, which shows a clean-out opening near the grid, none of these prior art patents shows means for purging the foreign matter from the interior of the housing except by at least partial disassembly of the strainer.

DESCRIPTION OF THE PREFERRED EMBODIMENT

Figure 1:
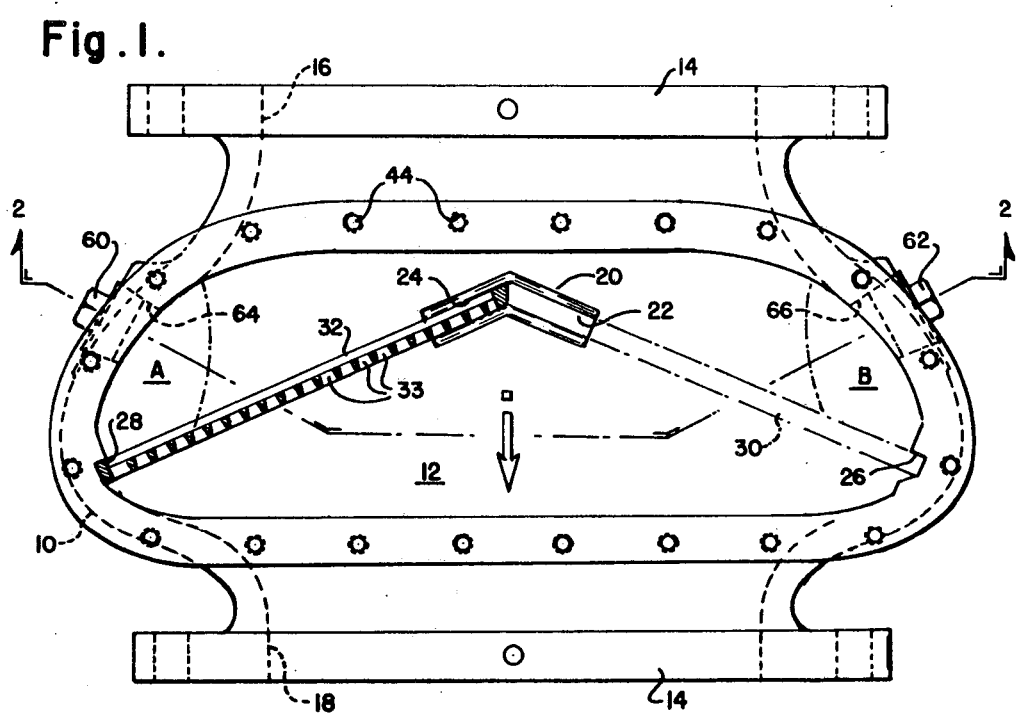
FIG. 1 is a top view of a strainer embodying the instant invention with its cover removed showing the interior of the strainer and the strainer grids.
Figure 2:
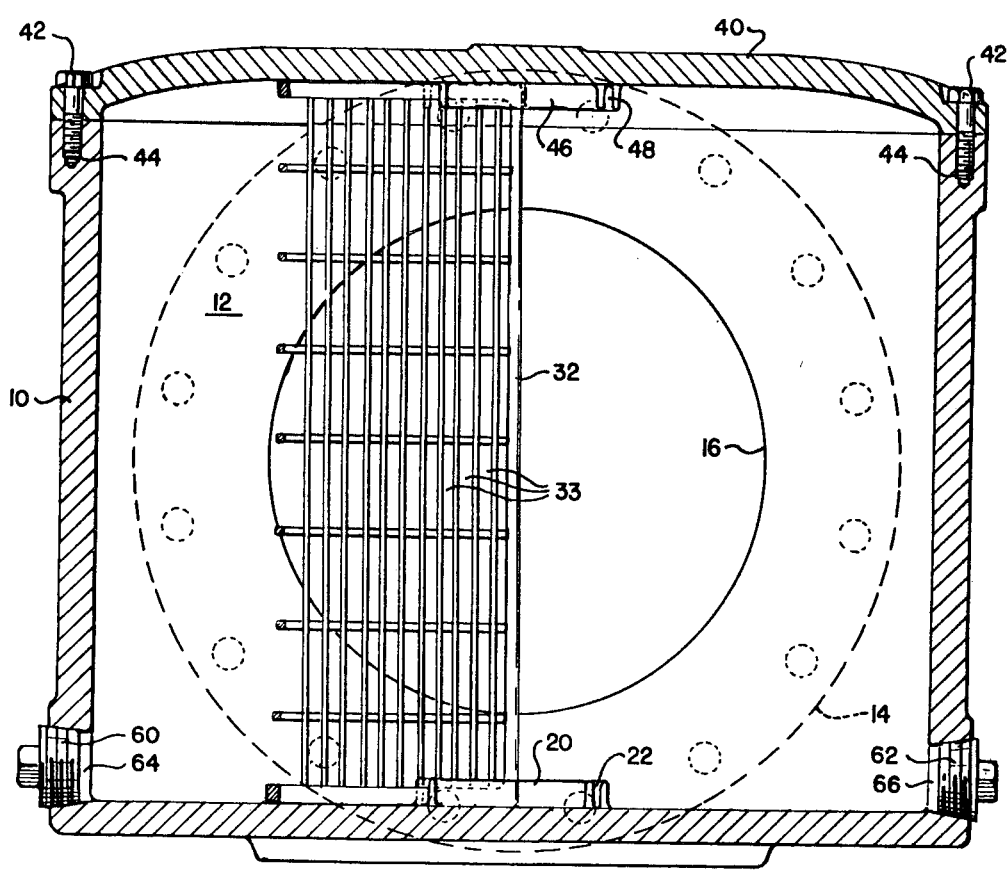
FIG. 2 is an elevation cross sectional view taken along line 2—2 of FIG. 1.

Referring to the drawings, the strainer is comprised of a main body member 10 which encloses within it a central chamber 12. Flange portions 14 are integrally formed on the body to facilitate coupling into a water line. Inlet 16 and outlet 18 communicate with central chamber 12. As best shown in FIGS. 1 and 2, an anchor boss 20 is formed on the bottom of the interior of body member 10 adjacent the inlet but below the level of the inlet. The anchor boss has angularly oriented slots 22 and 24 which form the apex of a triangle closely adjacent the inlet passage 16. Vertical slots 26 and 28 are formed into the interior side wall of the body 10 near the outlet passage 18. Strainer grids 30 and 32 of generally rectangular configuration have screen-like openings 33 and have one end respectively received in vertical groove 26 and vertical groove 28. The lower portions of the other ends of grids 30 and 32 are received respectively in grooves 22 and 24 of anchor boss 20. Thus, the grids form the apex of a triangle near the inlet passage 16 and extend angularly rearwardly towards the outlet and towards the interior side walls of the body 10. The body 10 has a configuration which provides regions A and B between the interior side walls of the housing and the end portions of the grid which region is located to the side and out of the mainstream of fluid flow.

Figure 3:
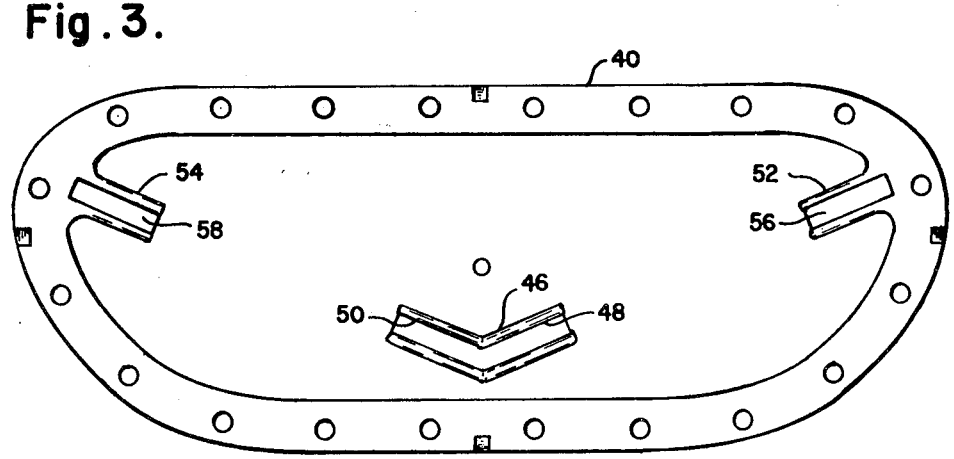
FIG. 3 is a view of the bottom of the cover member which is shown in place on the body of the strainer to FIG. 2.

A cover 40 is secured to the top of body 10 by means of a series of bolts 42 which extend through suitable openings in the peripheral region of the cover and are threadably received into correspondingly spaced tapped holes 44 in the top of body 10. As best shown in FIGS. 2 and 3, the interior bottom surface of the cover 40 has an anchor boss 46 which has angularly oriented grooves 48 and 50 formed into it. The anchor boss 46 and the grooves 48 and 50 are in vertical register with anchor boss 20 and grooves 22 and 24 when the cover is in place on the body 10 as shown in FIG. 2. Side anchor bosses 52 and 54 may be formed on the bottom surface of the cover and have grooves 56 and 58 respectively into which are received the upper end portions of the ends of the grids which are remote from the inlet passage 16 when the cover 40 is in position on top of the body member 10. Thus, the upper rearend portions of the grids 30 and 32 are firmly supported against the thrust of the flowing water.

As can best be seen from FIG. 1, water flowing through the strainer from the inlet 16 to the outlet 18 will pass through the grids 30 and 32. As foreign material of a size larger than the openings in the grids 30 and 32 are screened out by the grids, the continued thrust of the water flow against the material lodged on the grids will cause the foreign material to be moved along the grid towards the sides of the housing until it is deposited in the Regions A and B located to the side and out of the main fluid stream flowing through the strainer. In such a location, the foreign material and debris does not present a significant impediment to the main flow stream and therefore does not significantly increase the pressure drop or distort the flow velocity profile so that the grids need not be serviced as often as would be necessary in conventional strainers where the grid extends from opposite sides of the housing in a plane perpendicular to the axis of the inlet and outlet.

The Regions A and B where the debris is deposited may, however, be easily flushed out periodically by removal of plugs 60 and 62 from respective passages 64 and 66 located near the bottom of chamber 12. The dynamic force and the pressure of the water within the body 10 will tend to flush out the debris and foreign particles through the openings 64 and 66 when the plugs 60 and 62 are removed.

The triangle orientation of the grids with the apex near the inlet has a distinct advantage over the prior art. Frequently foreign particles of considerable size are carried along by the flow stream at considerable velocity. When these particles impact on grids positioned perpendicularly of the flow, frequent breakage of the grids result. With the grids triangularly oriented with the apex of the triangle adjacent the inlet, the grids are able to withstand impacts of a much greater force than the grids of the prior art strainers. It will also be apparent that triangularly oriented grids particularly when the apex of a triangle is adjacent the inlet will provide significantly greater impact resistance than that obtainable from diagonally disposed grids.

Grids which are diagonally disposed across the flow stream provide some cleansing action and slightly better impact resistance than those disposed perpendicular to the flow stream but because for a given size housing the angle at which the flow impinges on the grid is greater in the case of the triangularly oriented grid than with diagonally disposed grids, the cleansing action of the triangularly oriented grids is more effective. For a given size of housing trangularly oriented grids provide greater grid length and, therefore, the total area which triangularly oriented grids present to the flow is greater than that afforded by either perpendicularly or diagonally disposed grids. Thus because of industry standards, for a given size of strainer the individual openings in the grid may be smaller in the triangularly oriented grids.

From the foregoing, it will be appreciated that the arrangement herein described and hereinafter claimed provides a strainer which minimizes pressure loss and flow velocity profile distortion, greater impact resistance for the grid and requires less maintenance than conventional prior art devices of a similar nature.

The invention herein described may be embodied in other specific forms without departing form the spirit or essential characteristics thereof. The present embodiment is, therefore, considered to be in all respects illustrative and not restrictive, the scope of the invention being indicated by the appended claims and all departures from the foregoing description which would come within the meaning and range of equivalency of the claims are therefor intended to be embraced therein.

We claim:

1. A strainer for removing foreign matter from fluid flowing through a pipeline comprising; a body member enclosing a chamber, said body member including a bottom wall and side walls and being open opposite said bottom wall, inlet and outlet passages communicating with said chamber, removable grid means within said chamber spanning said inlet passage comprised of two angularly disposed panels which converge to form an apex at a point proximate to said inlet, a recess formed in the bottom wall into which is received the bottom portion of said grid means proximate to said inlet, a cover removably secured to said body to close the opening opposite said bottom wall, a recess formed on the inside of said cover into which is received the upper portion of said grid which is proximate to said inlet, whereby the portion of said grid means which is proximate said inlet is supported between said bottom wall and said cover when said cover is secured on said body to close said opening.

2. The strainer defined in claim 1 in which said grid means is comprised of two discrete panels separately removable from said body when said cover is removed.

3. The strainer defined in claim 2 in which the ends of said panels remote from said apex are supported on said side walls of said housing.

4. The strainer defined in claim 3 together with a normally closed passage formed in the wall of said housing upstream and proximate to the remote ends of said panels.

5. A strainer for removing foreign matter from fluid flowing through a pipeline comprising; a body enclosing a chamber, inlet and outlet passages communicating with said chamber, grid means within said chamber extending across the path of fluid flow through said strainer, said grid means being formed of two angularly oriented panels which converge to form an apex adjacent said inlet passage, support means on the interior of said body in the vicinity of said inlet for supporting said grid means in the vicinity of said apex.

6. The strainer defined in claim 5 in which said body is comprised of a main portion having an opening opposite one of its walls, a cover secured to said main portion to close said opening, said support means being comprised of support structures formed on aligned portions of the interior of said cover and the opposite wall of said main portion.

7. The strainer defined in claim 5 in which said grid means is comprised of two discrete panels which are separately removable from said chamber.

8. A strainer for removing foreign matter from fluid flowing through a pipeline comprising; a body member enclosing a chamber, said body member including a bottom wall and side walls and being open opposite said bottom wall, inlet and outlet passages communicating with said chamber, a cover removably secured to said body to close the opening opposite said bottom wall, grid means within said chamber comprised of two panels which converge to form an apex proximate said inlet, aligned support structure on the interior of said cover and said bottom wall for supporting the portions of said grid means which are proximate to said inlet against the thrust of fluid and foreign material.

9. The strainer defined in claim 8 in which said grid means is comprised of two discrete panels separately removable from said body when said cover is removed.

* * * * *